(12) United States Patent
Robinson et al.

(10) Patent No.: US 8,707,050 B1
(45) Date of Patent: Apr. 22, 2014

(54) INTEGRITY SELF-CHECK OF SECURE CODE WITHIN A VM ENVIRONMENT USING NATIVE VM CODE

(75) Inventors: Peter A. Robinson, Enoggera Reservoir (AU); Stefan Pingel, Everton Hills (AU); Jaimee Brown, Fortitude Valley (AU); Geetu Preet Sandhu, Wollstonecraft (AU)

(73) Assignee: EMC Corporation, Hopkinton, MA (US)

( * ) Notice: Subject to any disclaimer, the term of this patent is extended or adjusted under 35 U.S.C. 154(b) by 26 days.

(21) Appl. No.: 13/336,236

(22) Filed: Dec. 23, 2011

(51) Int. Cl.
*G06F 11/30* (2006.01)
*G06F 21/51* (2013.01)

(52) U.S. Cl.
CPC ...................................... *G06F 21/51* (2013.01)
USPC .......................................................... 713/187

(58) Field of Classification Search
None
See application file for complete search history.

(56) References Cited

U.S. PATENT DOCUMENTS

| | | | |
|---|---|---|---|
| 6,233,565 B1* | 5/2001 | Lewis et al. | 705/35 |
| 8,359,496 B1* | 1/2013 | Bornstein et al. | 714/45 |
| 2005/0216765 A1* | 9/2005 | Petkus et al. | 713/201 |
| 2008/0165970 A1* | 7/2008 | Chung et al. | 380/277 |
| 2009/0327743 A1* | 12/2009 | Finlayson et al. | 713/186 |
| 2010/0004939 A1* | 1/2010 | Ferraro et al. | 705/1 |
| 2011/0093691 A1* | 4/2011 | Galicia et al. | 713/2 |
| 2011/0093836 A1* | 4/2011 | Galicia et al. | 717/139 |
| 2011/0302629 A1* | 12/2011 | Whitson et al. | 726/3 |
| 2012/0023496 A1* | 1/2012 | Kwak et al. | 718/1 |
| 2012/0084542 A1* | 4/2012 | Reeves et al. | 713/1 |
| 2012/0174021 A1* | 7/2012 | Dharawat | 715/779 |
| 2012/0176546 A1* | 7/2012 | Yoon | 348/600 |
| 2012/0198030 A1* | 8/2012 | Wang et al. | 709/219 |
| 2012/0233668 A1* | 9/2012 | Leafe et al. | 726/4 |
| 2012/0291090 A1* | 11/2012 | Srinivasan et al. | 726/1 |
| 2013/0019183 A1* | 1/2013 | Reeves et al. | 715/745 |
| 2013/0073883 A1* | 3/2013 | Vick et al. | 713/320 |
| 2013/0080805 A1* | 3/2013 | Vick et al. | 713/320 |
| 2013/0111211 A1* | 5/2013 | Winslow et al. | 713/171 |

OTHER PUBLICATIONS

Dima, A., et al.; "Raising the bar on software security testing", May/Jun. 1999, IT Professional, vol. 1, Issue 3, pp. 27-32.*
Nauman, Mohammad, Sohail Khan, Xinwen Zhang, and Jean-Pierre Seifert. "Beyond kernel-level integrity measurement: enabling remote attestation for the android platform." in Trust and Trustworthy Computing, pp. 1-15. Springer Berlin Heidelberg, 2010.*

(Continued)

*Primary Examiner* — Brandon Hoffman
*Assistant Examiner* — Carlos Amorin
(74) *Attorney, Agent, or Firm* — BainwoodHuang

(57) ABSTRACT

A method of running an application in a process virtual machine (PVM) on a computing device using a dynamically-linked module (DLM) with an integrity self-check feature is provided. The DLM is written in PVM-native bytecode, and the PVM is configured to execute applications stored as PVM-native bytecode within a single code file associated with that application. The method includes (a) dynamically linking the application to the DLM by loading the PVM-native bytecode of the DLM from a resource file separate from the single code file of the application, (b) performing the integrity self-check feature on the DLM to ensure the integrity of the PVM-native bytecode of the DLM, and (c) in response to the DLM passing the integrity self-check, calling functions of the DLM from within the application. Embodiments directed to analogous computer program products and apparatuses are also provided.

20 Claims, 4 Drawing Sheets

(56) References Cited

OTHER PUBLICATIONS

"5.2.3 What Are RSA BSAFE CRYPTO-C and RSA BSAFE CRYPTO-J?" RSA Laboratories, downloaded from http://www.rsa.com/rsalabs/node.asp?id=2301, downloaded on Nov. 1, 2011.

Bray, Tim, "Custom Class Loading in Dalvik," downloaded from http://android-developers.blogspot.com/2011/07/custom-class-loading-in-dalvik.html, downloaded on Dec. 1, 2011.

Robinson, Peter Alan et al., "Message Bus Key Agreement Scheme," U.S. Appl. No. 13/169,179, filed Jun. 27, 2011.

* cited by examiner

INTEGRITY SELF-CHECK OF SECURE CODE WITHIN A VM ENVIRONMENT USING NATIVE VM CODE

BACKGROUND

In order to qualify for certain government standards, cryptographic software must satisfy certain conditions. One such condition, such as imposed by FIPS 140-2 (which has been promulgated by the Federal Government on May 25, 2011 and revised on Dec. 3, 2012), is that the cryptographic algorithms self-validate to ensure that they have not been corrupted. The process of certifying that such software meets the FIPS 140-2 standard can be expensive, often costing on the order of $100,000.

One conventional approach has satisfied the FIPS 140-2 conditions for cryptographic software on mobile devices running the ANDROID operating system (OS) by implementing the self-validating cryptographic algorithms in machine code to run on the mobile devices, the machine code being called as an external library by an ANDROID OS application the ANDROID OS application running within a DALVIK virtual machine (VM).

Another conventional approach has satisfied the FIPS 140-2 conditions for cryptographic software on mobile devices running the ANDROID operating system by implementing the self-validating cryptographic algorithms on a specialized hardware module. A similar hardware-based approach has been used by KoolSpan, Inc. of Bethesda Md. in its TrustChip® mobile encryption engine products (see http://www(dot)koolspan(dot)com/products/mobile-encryption-engine(dot)html and linked pages).

SUMMARY

Unfortunately, the above-described conventional approaches to satisfying FIPS 140-2 validation on a mobile device suffer from deficiencies. Implementing the self-validating cryptographic algorithms in machine code libraries rather than as native DALVIK VM code is less than ideal for at least two reasons. First, non-DALVIK VM code is unprotected and may crash the mobile device, while, in contrast, the DALVIK VM environment is protected against such crashes. Therefore, certain users are wary of operating non-DALVIK VM code on their devices for security and safety reasons. Second, non-DALVIK VM code is platform-dependent, while, in contrast, DALVIK VM bytecode is portable, capable of running on any DALVIK virtual machine. Thus, in order to operate on a wide variety of ANDROID operating system (OS) mobile devices, the cryptographic software must be shipped with the machine code libraries compiled for each different hardware platform, or customized distributions must be made based on the platform requirements. This requires complexity in distribution and installation as well as code bloat. Furthermore, since the self-validation must be done on the code just before execution, each separate compiled version must be separately FIPS 140-2 certified, multiplying the certification costs to several hundred thousand dollars, depending on the number of supported hardware platforms.

Implementing the self-validating cryptographic algorithms in hardware is also deficient because users typically do not want to carry extra hardware around with them, nor do manufacturers want to install extra hardware in their devices for only limited applications.

It would be desirable to implement self-validating cryptographic libraries in compliance with the FIPS 140-2 standard in native DALVIK VM code that is not susceptible to crash the system and that does not require re-compilation and re-certification for a multitude of hardware platforms. Thus, in contrast, the present disclosure is directed to techniques for using FIPS 140-2 certified self-validating cryptographic libraries implemented in portable form within the DALVIK virtual machine.

In one embodiment, a method of running an application in a process virtual machine (PVM) on a computing device using a dynamically-linked module (DLM) with an integrity self-check feature is provided. The DLM is written in PVM-native bytecode, and the PVM is configured to execute applications stored as PVM-native bytecode within a single code file associated with that application. The method includes (a) dynamically linking the application to the DLM by loading the PVM-native bytecode of the DLM from a resource file separate from the single code file of the application, (b) performing the integrity self-check feature on the DLM to ensure the integrity of the PVM-native bytecode of the DLM, and (c) in response to the DLM passing the integrity self-check, calling functions of the DLM from within the application. Embodiments directed to analogous computer program products and apparatuses are also provided.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Techniques are provided herein for using FIPS 140-2 certified self-validating cryptographic libraries implemented in portable form within the DALVIK virtual machine (VM) as well as additional generalized embodiments.

Figure 1:
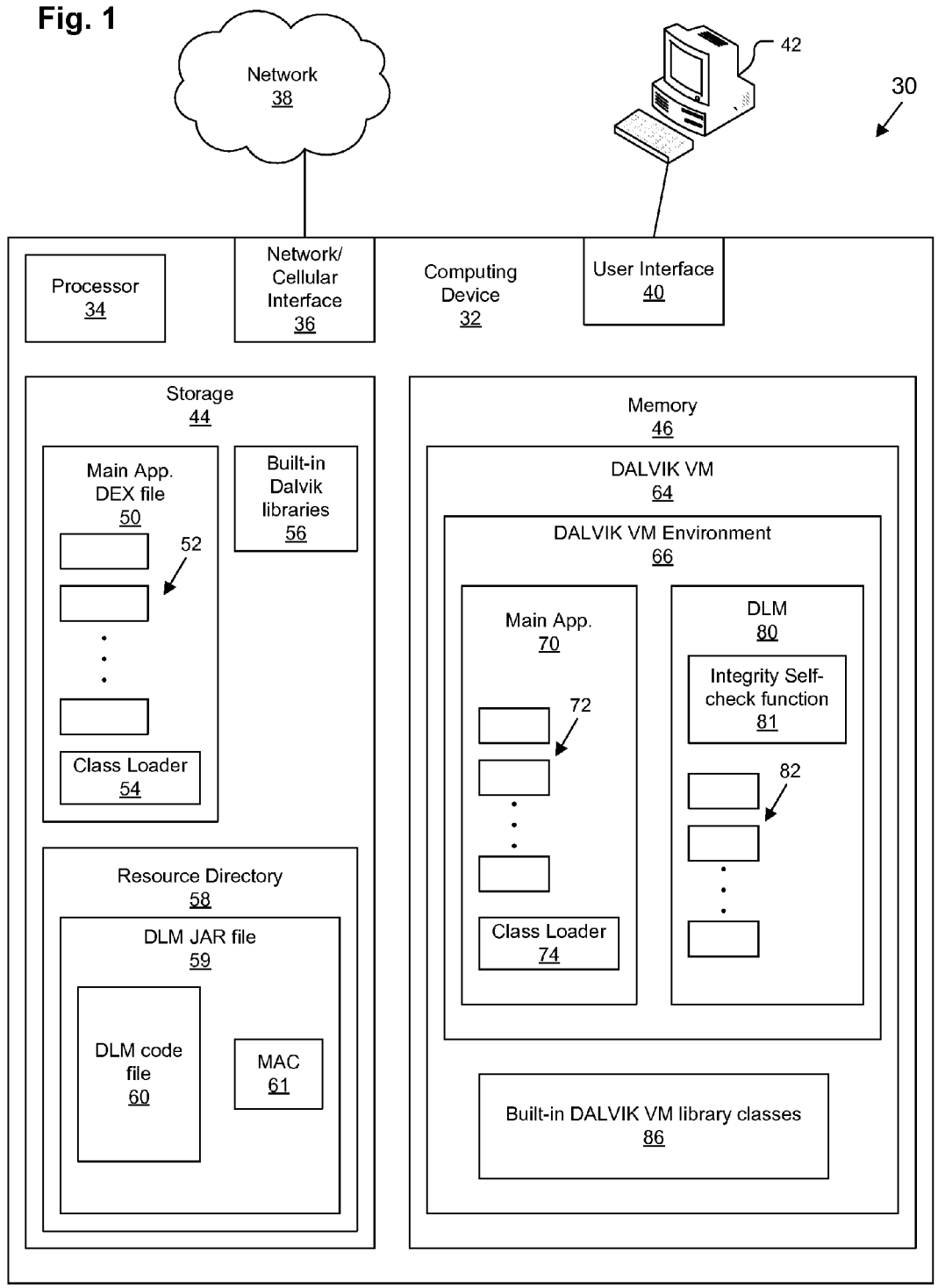
FIG. 1 illustrates an example system for use in connection with various embodiments.

FIG. 1 depicts a system 30 for use in connection with various embodiments. System 30 includes a computing device 32. Computing device 32 may be for example, a personal computer, a desktop computer, a workstation computer, a server computer, an enterprise server computer, a laptop computer, a mobile computer, a portable computing device, a tablet computing device, a smart phone, etc. In a typical embodiment, computing device 32 is a mobile computing device running any version (either presently released or substantially backwards-compatible with released versions) of the ANDROID operating system, produced by Google, Inc. of Mountain View, Calif.

Computing device 32 includes a processor 34. Processor 34 may be, for example, a central processing unit, a microprocessor, a collection of multiple microprocessors, a digital signal processor, a field-programmable gate array, a collection of circuits configured to perform various operations, or another similar device or set of devices configured to perform operations. Computing device 32 also includes a cellular and network interface 36 for connecting to network 38. Network 38 may be, for example, a wide area network (WAN), a local area network (LAN), a point-to-point connection, a cellular data network, etc.

Computing device 32 also includes a user interface (UI) 40, including circuitry, for connecting to one or more UI devices 42 in order to receive and transmit information to a user. UI devices 42 may include, for example, a display monitor, a touch-sensitive display device, a keyboard, a keypad, a mouse, a tracking pad, a tracking ball, a microphone, a speaker, other similar devices, or some combination thereof. In some embodiments, one or more of the UI devices 42 may be embedded within the computing device itself, such as, for example, a touch-sensitive display screen embedded within a cellular smart phone or tablet. The circuitry of UI 40 may include, for example, a graphics card, a graphics accelerator, a sound card, a serial port, a parallel port, an analog to digital converter, a digital to analog converter, or similar devices having similar functionality for connecting to UI devices 42.

Computing device 32 also includes storage 44 and memory 46. Storage 44 is a form of non-volatile memory for storing files and data. Storage 44 may be, for example, a hard disk drive, a floppy diskette drive, a CD-ROM drive, a DVD drive, a Blu-ray drive, a solid-state disk drive, magnetic storage, optical storage, flash memory, some combination thereof, or another similar device or set of devices configured to store application programs and or application data. Memory 46 may include, for example, system memory, cache memory, volatile memory, random access memory, some combination thereof, or another similar device or set of devices configured to store running software and or data.

Storage 44 stores a main application executable code file, such as, for example, main application DALVIK VM executable (DEX) code file 50. Main application DEX code file 50 includes a set of class definitions 52 and a loader class definition 54, making up a main application.

The class definitions 52, 54 are in a portable bytecode format, the portable bytecode format being designed to operate on a process virtual machine (PVM), which, as is well-known in the art, is a piece of application software that runs on the computing device 32 (on top of a separate host operating system, such as the ANDROID operating system) and that provides a virtual execution environment for the portable bytecode, the portable bytecode containing instructions which are executed by the PVM.

It should be understood that, within this Description, any time a piece of software is described as executing, running, operating, or performing a method, function, step, operation, etc., the method, function, step, or operation is actually performed by the processor 34 while executing code of the software stored in memory 46.

In one embodiment, used hereinafter as the primary example, the PVM is a DALVIK VM, and the class definitions 52, 54 are written in portable DALVIK VM bytecode. Class definitions 52, 54 may have been compiled from JAVA language source code or from any other kind of code which can be compiled and/or converted into DALVIK VM bytecode format, such as, for example, the GROOVY, SCALA, PYTHON, and C computer languages, etc. The portable bytecode is typically machine-readable code, which is code which does not actually contain alphanumeric characters, but rather binary codes that represent instructions. Machine-readable code is not directly understandable to most humans—rather a human will typically only be able to understand the machine-readable code once it has been converted into an assembly-like format.

Storage 44 also stores native DALVIK VM libraries 56, which may be accessed by any DALVIK VM application, as well as a resource directory 58 associated with the main application. If several DALVIK VM applications are installed on the computing device 32, each such application may have its own dedicated resource directory, although, in some embodiments, all applications may share a single resource directory. Resource directory 58 stores a dynamically-linked module (DLM) resource file, such as DLM JAR file 59. DLM JAR file 59 may be a compound file storing multiple files. One file stored within the DLM JAR file 59 is DLM code file 60, which stores DALVIK VM code to implement a DLM to be invoked by the main application. DLM JAR file 59 also stores a message authentication code (MAC) 61. DLM code file 60 is a self-validating file, which is configured to self-validate with reference to the MAC 61 before executing. Further details with respect to the DLM JAR file 59 and the self-validation process are provided below, in connection with FIG. 3.

Storage 44 may also store additional components (not depicted), such as an operating system, PVM code, other application programs (both native and PVM-based), application data, user data, etc.

Memory 46 stores a PVM, such as DALVIK VM 64 during execution, as well as other executing and loaded code such as the operating system, drivers, and other applications and data (not depicted). DALVIK VM 64 includes a DALVIK VM environment 66 for the execution of loaded DALVIK VM bytecode, such as main application classes 72 and loader class 74 (loaded from the set of class definitions 52 and the loader class definition 54, respectively) of a main application 70. Main application 70 is a DALVIK VM application, configured to make calls to a DLM 80 (encoded by DLM code file 60), also loaded in memory 46. DLM 80 includes an integrity self-check function 81 as well as one or more functions 82 configured to encode core functionality of the DLM 80. In one embodiment, the core functionality related to cryptographic operations. Memory 46 also stores native DALVIK VM library classes 86.

In operation, once the main application 70 has been loaded into memory 46 as main application classes 72 and loader class 74, loader class 74 attempts to load DLM 80 to allow the main application to call functions within the DLM 80. Loader class 74 first loads the contents of the DLM code file 60, and then calls an initialization function of the DLM 80, which is configured to activate the DLM 80 for execution once it is able to verify that the MAC 61 encodes an expected value, indicating that the code within the DLM code file 60 has not been corrupted. Further detail is provided below in connection with FIGS. 2-4.

Storage 44 may include a computer program product. The computer program product stores a computer program within a tangible non-transitory computer-readable storage medium. The computer program, when executed by processor 34 (and stored in memory 46), is configured to cause the processor 34 to perform a method (see FIG. 4, below) according to various embodiments.

Figure 2:
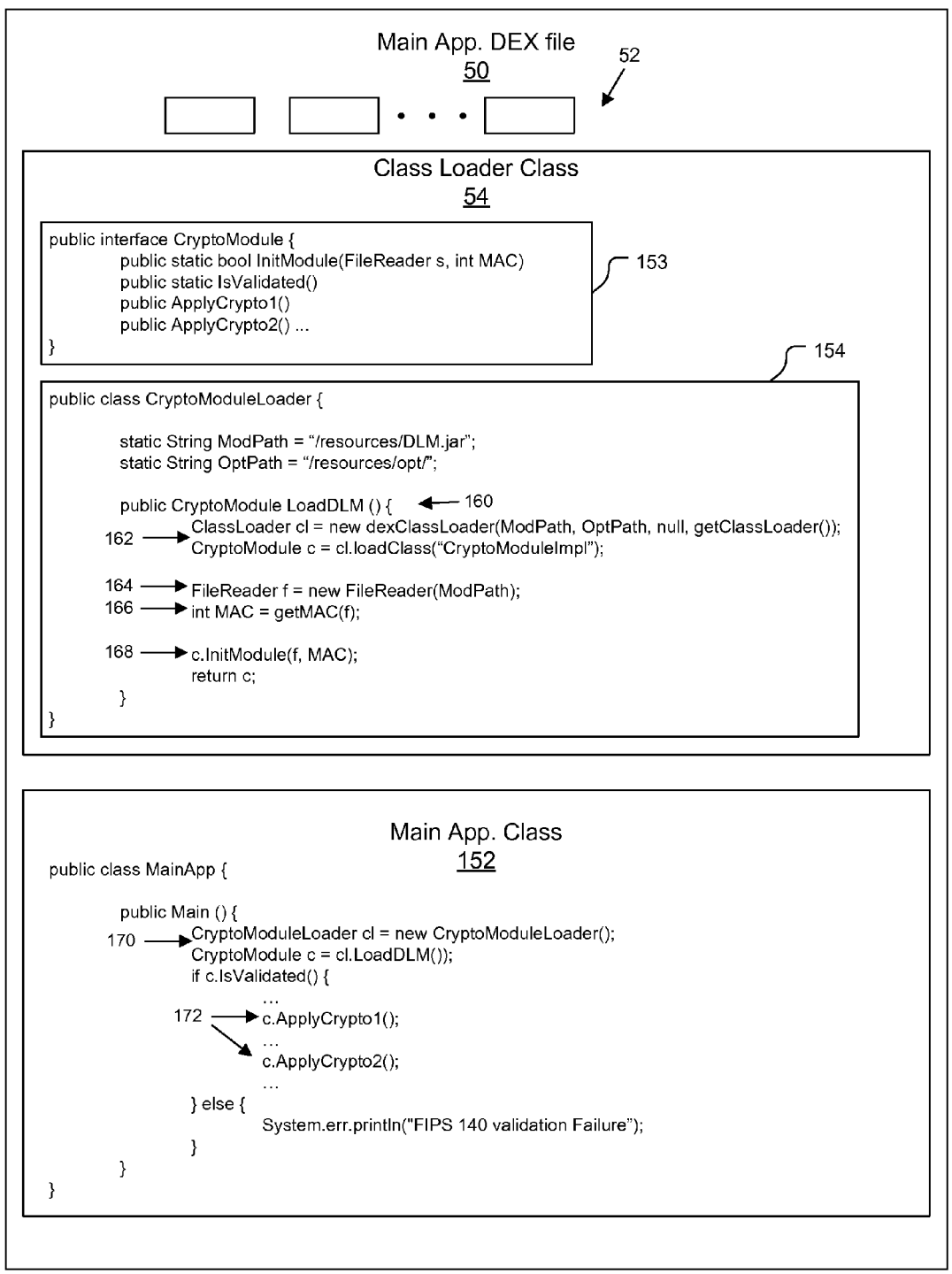
FIG. 2 illustrates additional detail with respect to an example code file for use in practicing various embodiments.

FIG. 2 depicts an example main application DEX code file 50 according to various embodiments. Main application DEX code file 50 includes a set of class definitions 52 and a loader class definition 54, encoding main application 70. The set of class definitions 52 includes a main application class definition 152. The loader class definition 54 and main application class definition 152 are depicted in further detail in the figure with example JAVA language code fragments. It should be understood that the loader class definition 54 and main application class definition 152 are actually stored within storage 44 as portable DEX machine code, and not JAVA language source code. However, since the DEX machine code is typically generated from JAVA language source code (by means of a JAVA language compiler and a DALVIK VM code converter), it is helpful to view the original source code which was used to encode the end-product DEX machine code.

Loader class definition 54 includes a declaration 153 of a JAVA language Interface called CryptoModule as well as a class definition 154 of a class called CryptoModuleLoader. CryptoModuleLoader 154 defines a LoadDLM function 160. LoadDLM function 160 includes a section of code 162 which is configured to load the DLM code file 60 from storage 44 and extract a DALVIK VM class called CryptoModuleImpl therefrom using reflection. It should be noted that the code 162 as depicted in the figure actually extracts the class directly from the DLM JAR File 59 for simplicity of presentation—in an actual implementation, additional code is used to open the JAR and extract the class from the DLM code File 60 instead. The extracted class is cast as a CryptoModule Interface 153 object, since it is expected that the CryptoModuleImpl class defined within the DLM code file 60 implements the CryptoModule Interface 153. Casting to a locally-declared Interface allows calls to the extracted class to be made without using reflection, which serves to optimize, since reflection is slow. LoadDLM function 160 also includes a section of code 164 which is configured to open the DLM JAR File 59 for reading, and a section of code 166 which is configured to call a function to extract the MAC 61 from the DLM JAR File 59. LoadDLM function 160 also includes a section of code 168 which is configured to call an initialization function, InitModule, of the newly-loaded CryptoModule Interface 153 object (since the CryptoModule Interface 153 declaration included a declaration of the InitModule function). In this function call to InitModule, the LoadDLM function 160 passes the MAC 61 and an object encoding an open file stream for accessing the DLM JAR file 59 to the InitModule function. That allows the InitModule function to self-validate with reference to the MAC 61 and the file stream.

Main application class definition 152 defines a main function, which is the main body of code executed by the main application 70 upon loading. The main function first includes a section of code 170 which is configured to invoke the CryptoModuleLoader class 154 and its LoadDLM function 160 in order to load and initialize the DLM 80. Once DLM 80 is loaded, if it is properly validated, the main function is able to make function calls 172 to particular core functions 82 of the DLM. It should be understood that, although these core functions 82 are defined within the DLM code file 60 and not within the main application DEX code file 50, the main application 70 is able to make these function calls 170 because the core functions 82 are declared within the CryptoModule Interface 153 declaration.

Figure 3:
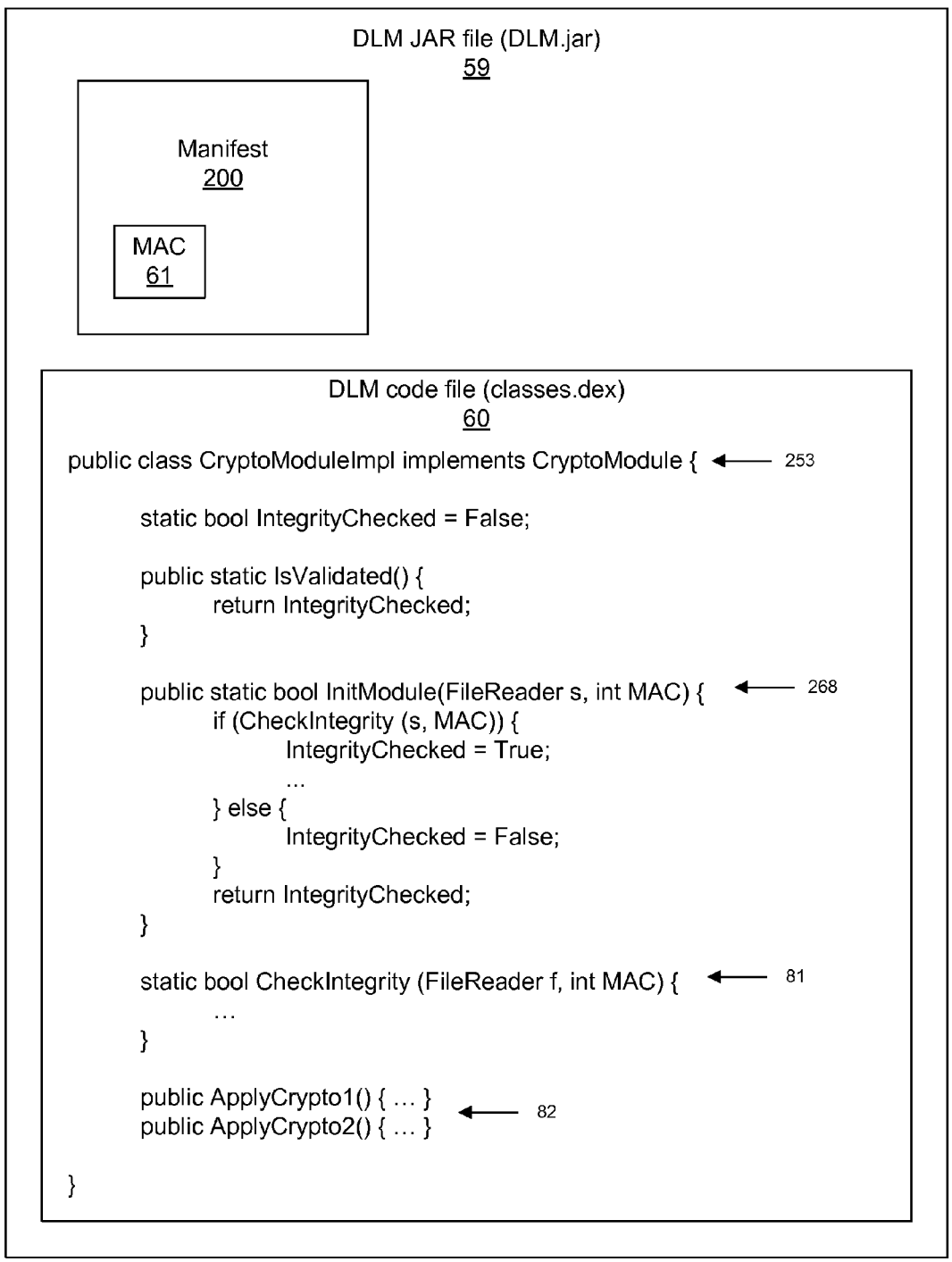
FIG. 3 illustrates additional detail with respect to another example code file for use in practicing various embodiments.

FIG. 3 depicts an example DLM JAR file 59 according to various embodiments. DLM JAR file 59 includes DLM code file 60 and a manifest 200 which stores MAC 61. Manifest 200 may also store additional information, such as metadata about the DLM code file 60 and any other files stored within DLM JAR file 59. MAC 61 encodes a unique signature which may be used to validate the integrity of the DLM code file 60. In some embodiments, MAC 61 is a symmetric signature, while in other embodiments, MAC 61 is an asymmetric signature. In some embodiments, MAC 61 is a cryptographic hash, while in other embodiments, MAC 61 is a non-cryptographic hash, fingerprint, or checksum. MAC 61 should have the property that any small change to the contents of DLM code file 60 should result in a different value for MAC 61.

The contents of DLM code file 60 are depicted in further detail in the figure with example JAVA language code fragments. It should be understood that the contents of DLM code file 60 are actually stored within storage 44 as portable DEX machine code, and not JAVA language source code. However, since the DEX machine code is typically generated from JAVA language source code (by means of a JAVA language compiler and a DALVIK VM code converter), it is helpful to view the original source code which was used to encode the end-product DEX machine code.

DLM code file 60 includes a definition of the CryptoModuleImpl class 253, which implements the CryptoModule Interface 153 declared within the loader class definition 54. CryptoModuleImpl class 253 defines the InitModule function 268 which was also declared within the CryptoModule Interface 153. Upon receiving a file stream reference and a MAC value 61, the InitModule function 268 is configured to perform an integrity self-check by calling CheckIntegrity function 81. CheckIntegrity function 81 reads the entirety of the DLM code file 60 from storage 44, computes a signature (or, in some embodiments, a hash, fingerprint, or checksum) of the DLM code file 60, and compares the value to the MAC value 61 received. If the comparison of the values indicates that the file has not been altered (according to techniques well-understood in the art), then the CheckIntegrity function 81 returns TRUE, otherwise, FALSE. The reason why the InitModule function 268 is passed the file stream reference (which, it should be understood, may be any kind of object capable of reading from a file, such as an IOStream, a File Reader, etc.), is because the DALVIK VM does not allow code to read the file in which it is itself stored. Thus, the DLM 80, which is stored in the DLM code file 60, cannot directly access the code of the DLM code file 60 from storage 44. Rather, the main application 70 accesses the code of the DLM code file 60 and passes the file object to the DLM 80.

If the CheckIntegrity function 81 returns TRUE, then the InitModule function 268 is configured to perform various actions to enable the DLM 80 for future function calls. Otherwise, the InitModule function 268 deactivates the DLM 80 such that it is not available to be called. CryptoModuleImpl class 253 also defines the various core functions 82 which may be called by code 172 in the main application class 152.

Figure 4:
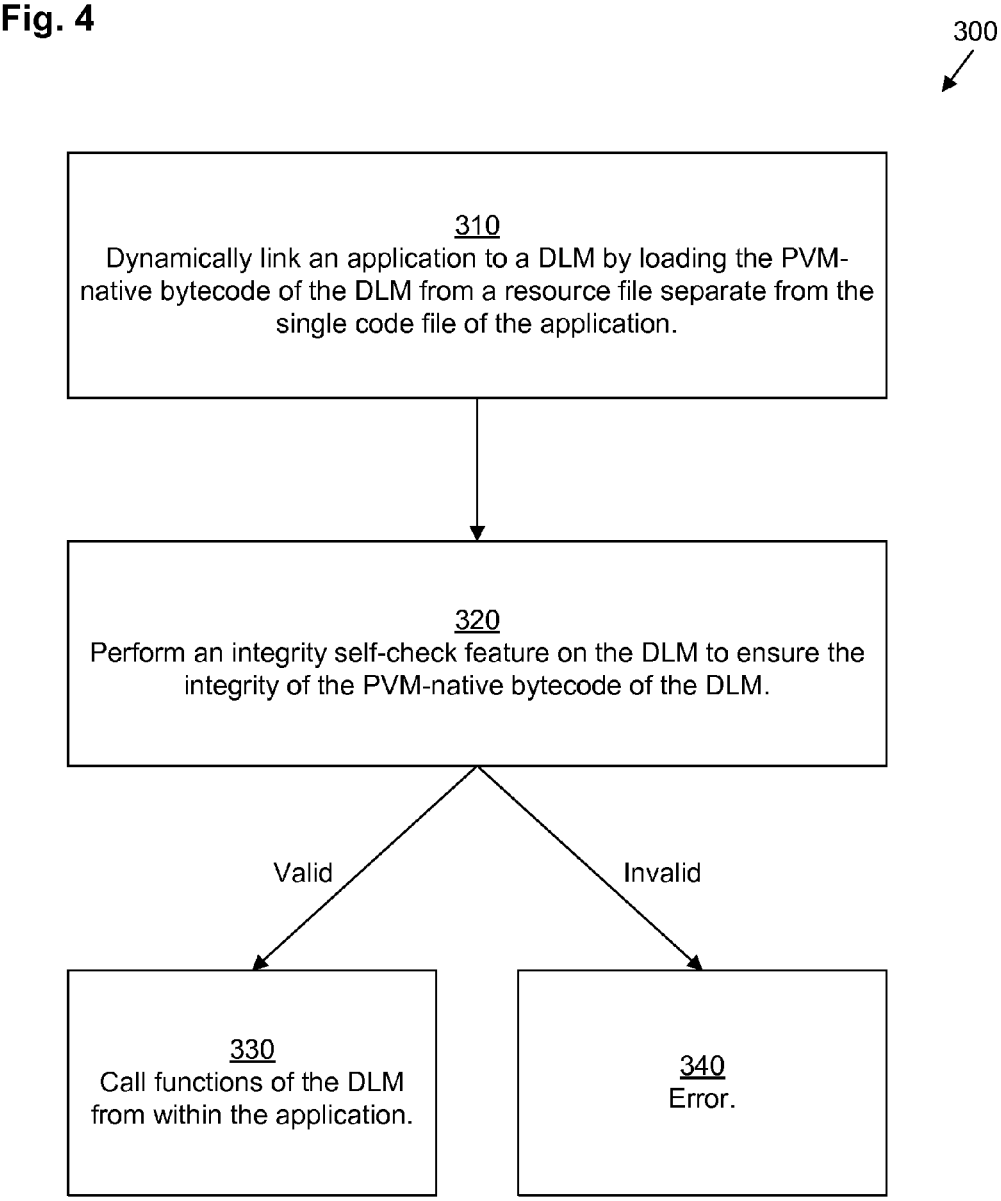
FIG. 4 illustrates an example method according to one embodiment.

FIG. 4 depicts an example method 300 according to various embodiments. Method 300 is performed by computing device 32. In step 310, the PVM (e.g., DALVIK VM 64) dynamically links the main application 70 to the DLM 80 by loading the bytecode of the DLM 80 from a resource file (e.g., DLM JAR file 59) separate from the single code file (e.g., main application DEX code file 50) of the main application 70. Main application 70 is run within the PVM environment (e.g., DALVIK VM environment 66), typically upon being loaded by a user via the UI 42. When the main application 70 is run, classes 72 may be executed to perform core operations of the main application. At some point during execution, code contained within the DLM 80 may be needed to be executed in conjunction with the main application classes 72. In one embodiment, upon the main application 70 first loading, loader class 74 may be invoked to load DLM 80 from the DLM JAR file 59. In other embodiments, the loader class 74 may only be invoked to perform that function upon code from the main application classes 72 actually having a need to invoke core classes 82 of the DLM 80 within the context of operation. In any case, once the LoadDLM function 160 of the loader class 74 is invoked, it causes the DLM code file 60 to be extracted from DLM JAR file 59 and loaded as a class.

In step 320, the DLM 80 performs an integrity self-check to ensure the integrity of the code contained within DLM code file 60 before it is invoked. First, the LoadDLM function 160 of the loader class 74 executes code segments 164, 166 to set up the DLM JAR file 59 as a file object and to read the MAC 61. Then, the LoadDLM function 160 executes code segment 168 to call the InitModule function 268 of the DLM 80. DLM 80 is then able to run the InitModule function 268 to perform the integrity self-check by reading the contents of the DLM code file 60 from the file object, hashing the contents, and comparing with the MAC 61. It should be understood that, although, as described, the MAC 61 is passed to the InitModule function 268, in some embodiments, the InitModule function 268 does not receive the MAC 61 as an argument, but, rather, the InitModule function 268 reads the MAC 61 from DLM JAR file 59 via the file object.

In step 330, which is performed only if the self-check is successful, the main application 70 is able to call core classes 82 of the DLM 80 within the context of operation in order to carry out various cryptographic operations.

In step 340, if the self-check is unsuccessful, an error is returned, and the main application 70 is not able to call the core classes 82.

In some embodiments, a second application distinct from main application 70 may also be configured to invoke the same DLM 80 either from the same DLM JAR file 59 in the resource directory 58 or from a different copy of the same DLM JAR file 59 in a different resource directory. In either case, the contents of the DLM JAR files 59 are identical. Thus, only one FIPS 140-2 certification is needed even though two or more applications may make use of the code therein, saving many thousands of dollars in certification costs.

Thus, techniques have been provided to allow for a self-validating external native VM code module (DLM 80) to be called by main application 80 in the context of operation by a VM 64 that is configured to execute code from a single code file 50 and to prohibit code from directly accessing itself in storage 44.

While various embodiments of the invention have been particularly shown and described, it will be understood by those skilled in the art that various changes in form and details may be made therein without departing from the spirit and scope of the invention as defined by the appended claims.

For example, although embodiments have been described in which the PVM is the DALVIK virtual machine and the portable bytecode is DALVIK VM bytecode, it should be understood that this is by way of example only. In other embodiments, other PVMs that execute other forms of bytecode may be used instead, provided that the PVM is configured to either execute native code only from within a single file or to prevent executing code from accessing itself in storage.

As an additional example, it should be understood that, although various embodiments have been described in the context of FIPS 140-2 validation and certification, other forms of integrity self-check validation are also encompassed within the invention.

As an additional example, it should be understood that, although various embodiments have been described as being methods, computer programs embodying these methods may also be included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded or are impossible.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method of running an application in a process virtual machine (PVM) on a computing device using a dynamically-linked module (DLM) with an integrity self-check feature, the DLM being written in PVM-native bytecode, the PVM being configured to execute applications stored as PVM-native bytecode within a single code file associated with that application, the method comprising:
    dynamically linking the application to the DLM by loading the PVM-native bytecode of the DLM from a resource file separate from the single code file of the application;
    performing the integrity self-check feature on the DLM to ensure the integrity of the PVM-native bytecode of the DLM; and
    in response to the DLM passing the integrity self-check, calling functions of the DLM from within the application.

2. The method of claim 1 wherein:
    the PVM is configured to disallow executing applications from accessing their own source code; and
    performing the integrity self-check feature on the DLM includes executing a function of the DLM to read a file stream object pointing to the resource file, the file stream object having been passed to the function from the application.

3. The method of claim 2 wherein the PVM is a DALVIK virtual machine running on an ANDROID operating system, and the computing device is a mobile communications device.

4. The method of claim 1 wherein performing the integrity self-check feature on the DLM includes validating that the PVM-native bytecode of the DLM stored within the resource file has a signature equal to a predefined signature.

5. The method of claim 1 wherein the PVM-native bytecode of the DLM is configured to cause the PVM to execute a cryptographic routine.

6. The method of claim 5 wherein performing the integrity self-check feature on the DLM includes validating that the PVM-native bytecode of the DLM stored within the resource file has a signature equal to a predefined signature in accordance with a FIPS 140-2 standard as promulgated by the Federal Government on May 25, 2011 and revised on Dec. 3, 2012.

7. The method of claim 1 wherein the method further comprises:
    dynamically linking another application running on the PVM to the DLM by loading the PVM-native bytecode of the DLM from the resource file, the other application being distinct from the application, the resource file being separate from the single code file of the other application;
    again performing the integrity self-check feature on the DLM to ensure the integrity of the PVM-native bytecode of the DLM; and in response to the DLM again passing the integrity self-check feature, calling functions of the DLM from within the other application.

8. The method of claim 1 wherein:
dynamically linking the application to the DLM by loading the PVM-native bytecode of the DLM from the resource file includes executing a class loader function from the application to load a class defined within the PVM-native bytecode of the DLM in the resource file;
performing the integrity self-check feature includes:
establishing a file stream object within the application;
opening the resource file for reading in connection with the file stream object; and
initializing the loaded class within the application, wherein initializing includes:
calling an initialization function of the loaded class from the application, the initialization function being defined within the PVM-native bytecode of the DLM in the resource file;
passing the file stream object from the application to the initialization function; and
executing the initialization function to:
read the PVM-native bytecode of the DLM in the resource file via the file stream object;
calculate a signature of the PVM-native bytecode of the DLM read from the resource file;
compare the calculated signature to a predefined signature stored within the resource file; and
activate the loaded class if the comparison succeeds, otherwise deactivating the loaded class; and
calling functions of the DLM from within the application in response to the DLM passing the integrity self-check feature includes calling a function of the loaded class other than the initialization function from the application.

9. The method of claim 8 wherein:
executing the class loader function from the application to load the class defined within the PVM-native bytecode of the DLM in the resource file includes storing the loaded class within a variable of a type defined by an abstract Interface, the abstract Interface being declared within the PVM-native bytecode of the application within the single code file, the class defined within the PVM-native bytecode of the DLM implementing the abstract Interface;
calling the initialization function of the loaded class from the application includes calling an abstract initialization function declared within the abstract Interface, the abstract initialization function being implemented by a defined initialization function defined within the class defined within the PVM-native bytecode of the DLM implementing the abstract Interface; and
calling the function of the loaded class other than the initialization function from the application includes calling another abstract function declared within the abstract Interface, the other abstract function being implemented by a defined other function defined within the class defined within the PVM-native bytecode of the DLM implementing the abstract Interface.

10. The method of claim 8 wherein initializing the loaded class within the application further includes:
reading the predefined signature from a manifest of the resource file via the file stream object; and
passing the predefined signature from the application to the initialization function.

11. A computer program product comprising a non-transitory tangible computer-readable storage medium storing instructions, which, when executed by a process virtual machine (PVM) running on a mobile computing device, cause the mobile computing device to run an application in the PVM using a dynamically-linked module (DLM) with an integrity self-check feature, the DLM being written in PVM-native bytecode, the PVM being configured to execute applications stored as PVM-native bytecode within a single code file associated with that application, wherein running the application comprises:
dynamically linking the application to the DLM by loading the PVM-native bytecode of the DLM from a resource file separate from the single code file of the application;
performing the integrity self-check feature on the DLM to ensure the integrity of the PVM-native bytecode of the DLM; and
in response to the DLM passing the integrity self-check feature, calling functions of the DLM from within the application.

12. The computer program product of claim 11 wherein performing the integrity self-check feature on the DLM includes validating that the PVM-native bytecode of the DLM stored within the resource file has a signature equal to a predefined signature.

13. The computer program product of claim 11 wherein the PVM-native bytecode of the DLM is configured to cause the PVM to execute a cryptographic routine.

14. The computer program product of claim 13 wherein performing the integrity self-check feature on the DLM includes validating that the PVM-native bytecode of the DLM stored within the resource file has a signature equal to a predefined signature in accordance with a FIPS 140-2 standard as promulgated by the Federal Government on May 25, 2011 and revised on Dec. 3, 2012.

15. The computer program product of claim 11 wherein:
dynamically linking the application to the DLM by loading the PVM-native bytecode of the DLM from the resource file includes executing a class loader function from the application to load a class defined within the PVM-native bytecode of the DLM in the resource file;
performing the integrity self-check feature includes:
establishing a file stream object within the application;
opening the resource file for reading in connection with the file stream object; and
initializing the loaded class within the application, wherein initializing includes:
calling an initialization function of the loaded class from the application, the initialization function being defined within the PVM-native bytecode of the DLM in the resource file;
passing the file stream object from the application to the initialization function; and
executing the initialization function to:
read the PVM-native bytecode of the DLM in the resource file via the file stream object;
calculate a signature of the PVM-native bytecode of the DLM read from the resource file;
compare the calculated signature to a predefined signature stored within the resource file; and
activate the loaded class if the comparison succeeds, otherwise deactivating the loaded class; and calling functions of the DLM from within the application in response to the DLM passing the integrity self-check feature includes calling a function of the loaded class other than the initialization function from the application.

16. The computer program product of claim 15 wherein:

executing the class loader function from the application to load the class defined within the PVM-native bytecode of the DLM in the resource file includes storing the loaded class within a variable of a type defined by an abstract Interface, the abstract Interface being declared within the PVM-native bytecode of the application within the single code file, the class defined within the PVM-native bytecode of the DLM implementing the abstract Interface;

calling the initialization function of the loaded class from the application includes calling an abstract initialization function declared within the abstract Interface, the abstract initialization function being implemented by a defined initialization function defined within the class defined within the PVM-native bytecode of the DLM implementing the abstract Interface; and calling the function of the loaded class other than the initialization function from the application includes calling another abstract function declared within the abstract Interface, the other abstract function being implemented by a defined other function defined within the class defined within the PVM-native bytecode of the DLM implementing the abstract Interface.

17. The computer program product of claim 15 wherein initializing the loaded class within the application further includes:

reading the predefined signature from a manifest of the resource file via the file stream object; and passing the predefined signature from the application to the initialization function.

18. An apparatus comprising:

a processor;

non-volatile storage; and memory, the memory including instructions for running an application in a process virtual machine (PVM) running on the processor using a dynamically-linked module (DLM) with an integrity self-check feature, the DLM being written in PVM-native bytecode, the PVM being configured to execute applications stored as PVM-native bytecode within a single code file stored in the non-volatile storage associated with that application, wherein running the application includes:

dynamically linking the application to the DLM by loading the PVM-native bytecode of the DLM from a resource file stored in the non-volatile storage separate from the single code file of the application;

performing the integrity self-check feature on the DLM to ensure the integrity of the PVM-native bytecode of the DLM; and in response to the DLM passing the integrity self-check feature, calling functions of the DLM from within the application.

19. The apparatus of claim 18 wherein:

the PVM is configured to disallow executing applications from accessing their own source code; and performing the integrity self-check feature on the DLM includes executing a function of the DLM to read a file stream object pointing to the resource file, the file stream object having been passed to the function from the application.

20. The apparatus of claim 19 wherein:

the apparatus is a mobile communications device; and the PVM is a DALVIK virtual machine running on an ANDROID operating system.

\* \* \* \* \*